April 27, 1926.

H. H. TRAIL

ENGINE STARTER DRIVE

Filed July 14, 1925

1,582,493

HERBERT HORATIO TRAIL
INVENTOR.

BY *Marks & Clerk*
ATTORNEYS.

Patented Apr. 27, 1926.

1,582,493

UNITED STATES PATENT OFFICE.

HERBERT HORATIO TRAIL, OF VANCOUVER, BRITISH COLUMBIA, CANADA.

ENGINE-STARTER DRIVE.

Application filed July 14, 1925. Serial No. 43,609.

*To all whom it may concern:*

Be it known that I, HERBERT HORATIO TRAIL, subject of Great Britain, residing at 2326 First Avenue, West, in the city of Vancouver, Province of British Columbia, Canada, have invented certain new and useful Improvements in Engine-Starter Drives, of which the following is a specification.

This invention relates to engine starter drives and has for its object to provide a simple and improved drive mechanism whereby the risk of damage or breakage to the teeth is materially reduced.

According to the present invention this object is achieved by providing means which move a driving pinion towards its driving position at two different speeds, an initial period of relatively slow movement being followed by a faster movement when the pinion has begun to enter into mesh with a gear on the engine to be started.

Further features of the invention will become apparent from the following description and will be more particularly pointed out in the appended claims.

Referring now to the accompanying drawings, which illustrate by way of example one convenient embodiment of the invention :—

Figure 1:
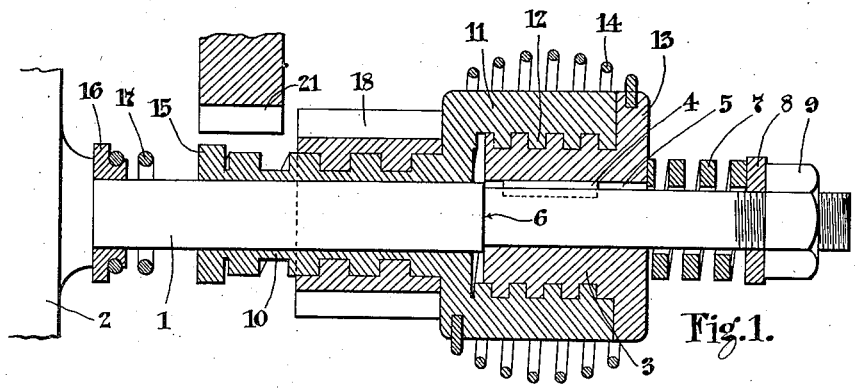
Figure 1 is a sectional elevation showing the drive in its normal position.

The numeral 1 indicates the armature shaft of a motor 2. An externally screw threaded sleeve 3 is secured against rotary movement on shaft 1 by means of a key 4 engaging a keyway 5 in the bore of sleeve 3. Forward axial movement of the sleeve 3 is limited by a shoulder 6 against which the sleeve is normally maintained by means of a strong spring 7 disposed between the rear end of the sleeve 3 and a collar 8 held on the end of the shaft 1 by a nut 9. A second sleeve 10, formed with a screw thread of coarser pitch than that of sleeve 3, is mounted for axial or rotary movement on the shaft 1. The sleeve 10 carries at its rear end an enlarged annular member 11 formed with internal means such as a thread 12 to engage the thread on the sleeve 3. The member 11 is normally held against a flange 13 on the sleeve 3 by means of a coiled spring 14, as shown in Figure 1.

The front end of sleeve 10 is preferably formed with a flange 15. A collar 16 is secured to the shaft 1 and a spring 17 is carried by the collar preferably by having its end convolution snapped into an annular recess in the collar 16.

A driving pinion 18 is internally formed with an internal screw thread or mechanical equivalent thereof to engage the thread on sleeve 10.

Means, such as a spring latch 19 on member 11 coacting with a notch 20 in the pinion 18, is provided to maintain the pinion against accidental movement from its normal position.

The operation of the drive is as follows:—

When the circuit of motor 2 is closed the shaft 1 rotates at a high speed but for a short time the structure comprising the pinion 18, sleeve 10 and member 11, remains stationary or rotates at much slower speed than the shaft 1 by reason of the inertia of these parts due to their mass. As the sleeve 3 rotates in the member 11 the latter is forced in an axial direction away from the flange 13 against the tension of spring 14 until the pinion 18 begins to mesh with a gear 21 on the engine to be started, this position being shown in Figure 2. As soon as the teeth of pinion 18 enter the teeth of gear 21 the pinion is momentarily held against rotary motion and the driving strains between the pinion and sleeve 10 and between member 11 and sleeve 3 are increased, and consequently the sleeve 3 and member 11 tend to separate, the sleeve 3 moving towards the right and compressing the spring 7, and the sleeve 10, with its member 11, moving to the right, until it compresses the spring 17. Simultaneously, the thread on sleeve 10 drives the pinion 18 into contact with flange 15, in which position it is completely into mesh as shown in Fig. 3. It will be noticed that owing to the relatively short pitch of the thread on sleeve 3, the initial movement of the pinion towards its meshing position is slow, while the completion of the movement of the pinion into mesh is accomplished very quickly owing to the relatively longer pitch of the thread on sleeve 10, which latter thread does not effect movement of the pinion until the pinion has just started to enter into mesh. During the drive the sleeve 3 and member 11 are tending to separate against the action of spring 14, and therefore springs 7 and 17 are compressed to an extent depending on the resistance offered by the engine. Consequently the drive has a certain amount of flexibility, though the drive is not dependent on the springs 7 and 17, and should they break, there will still be an effective solid drive through the broken portions of the springs. The spring 14 is a light spring which merely returns the member 11 to its normal position, and does not transmit any driving energy.

Figure 2:
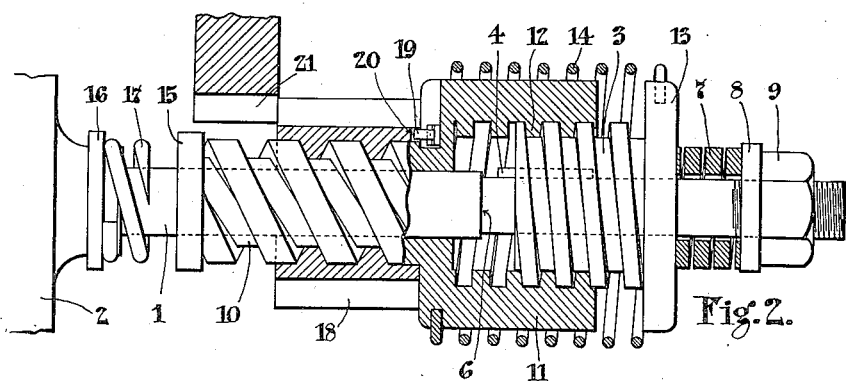
Figure 2 is an elevation partially in section showing the pinion beginning to mesh and Figure 3 is a side elevation showing the pinion in mesh.
Figure 3:
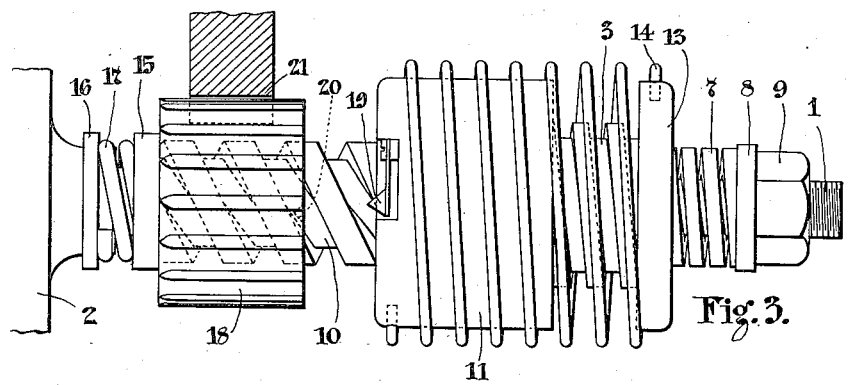

If during the initial movement of the member 11 caused by the thread on sleeve 3, the teeth of pinion 18 strike the end faces of the teeth of gear 21, the sleeve 3 will move to the right against spring 7, as shown in Figure 2, and during this movement the driving strain between the sleeve 3 and member 11 is increased so that member 11 rotates with sleeve 3 until the teeth of the pinion are in proper position for entering into mesh. The pinion then enters the gear teeth and its rotation being momentarily arrested by gear 21 the thread on sleeve 10 completes the meshing operation quickly as above described.

The relatively slow initial movement of the pinion minimizes risk of damage or breakage of the teeth, and the quick subsequent movement ensures that the pinion will be completely in mesh before the full driving strain between the parts is developed.

As soon as the engine starts to run under its own power, the pinion 18 is thrown out of mesh along the thread on sleeve 10. The springs 7 and 17 expand and the spring 14 contracts, thus bringing the parts back to their normal position as shown in Figure 1.

The latch 19, engaging the notch 20 ensures that the pinion will be held in its normal position against accidental movement along the sleeve 11 which might otherwise be caused by vibration or inclination of the car while travelling up or down hill.

It will be understood that the foregoing description is given by way of example only and that any modifications within the scope of the appended claims may be made without departing from the spirit of the invention.

What I claim is:—

1. An engine starter drive comprising a driving shaft, an externally screw threaded sleeve freely mounted on said shaft, a pinion mounted on said screw thread, a second sleeve mounted on and rotatable with the shaft, and a screw connection between said sleeves whereby rotation of the second mentioned sleeve causes axial movement of the first mentioned sleeve.

2. An engine starter drive comprising a driving shaft, an externally screw threaded sleeve freely mounted on said shaft, a pinion mounted on said screw thread, a second externally screw threaded sleeve on and rotatable with said shaft, and an annular member carried by said first mentioned sleeve and provided with an internal screw thread for engaging the thread on the second mentioned sleeve.

3. An engine starter drive as claimed in claim 2 wherein spring means is provided which screw the second mentioned sleeve into said annular member.

4. An engine starter drive as claimed in claim 2, wherein said second mentioned sleeve is provided with a flange against which the annular member normally bears, and a tension spring is provided which is connected at one end to said flange and at the other end to said annular member.

5. An engine starter drive as claimed in claim 2, wherein said second mentioned sleeve is provided with a flange against which the annular member normally bears, and a tension spring is provided which surrounds said annular member and is connected at one end to said flange and at the other end to said annular member.

6. An engine starter drive comprising a driving shaft, an externally screw threaded sleeve freely mounted on said shaft, an internally threaded pinion in engagement with the thread on said sleeve, a second externally threaded sleeve mounted rotatable with but capable of axial movement on said shaft, an annular member carried by said first mentioned sleeve and provided with an internal screw thread for engaging the thread on said second mentioned sleeve, spring means connecting the annular member with the second mentioned sleeve, and spring means adapted to be flexed when the second mentioned sleeve is moved axially away from the annular member.

7. An engine starter drive as claimed in claim 6, wherein spring means is provided which are adapted to be engaged by the first named sleeve when the pinion is in mesh with a gear on the engine to be started.

8. An engine starter drive as claimed in claim 2, wherein the pinion is normally positioned at the end of said first mentioned sleeve adjacent the annular member, and spring pressed means is provided for retaining the pinion in such normal position.

9. An engine starter drive comprising a driving shaft, a pinion capable of rotary and axial movement with respect to said shaft, screw threaded means for initially moving the pinion axially at a relatively slow speed until it begins to mesh with a gear on the engine to be started, and screw threaded means for continuing the axial movement of the pinion at a relatively high speed to move the pinion completely into mesh.

10. An engine starter drive comprising a driving shaft, a pinion capable of rotary and axial movement with respect to said shaft, a member having a screw thread of relatively short pitch for causing initial axial movement of the pinion at a relatively slow speed until it begins to mesh with a gear on the engine to be started, and a second member having a screw thread of relatively long pitch for causing continued axial movement of said pinion at a relatively high speed to move the pinion completely into mesh.

11. An engine starter drive comprising a driving shaft, a sleeve mounted for axial and rotary movement on said shaft and having a screw thread of relatively long pitch, a second sleeve mounted to rotate with said shaft but capable of axial movement thereon and having a screw thread of relatively short pitch, an annular member carried by said first mentioned sleeve and provided with a thread to engage the thread of said second mentioned sleeve, and a pinion having a screw threaded bore to engage the thread of said first mentioned sleeve.

In testimony whereof I affix my signature.

HERBERT HORATIO TRAIL.